UNITED STATES PATENT OFFICE.

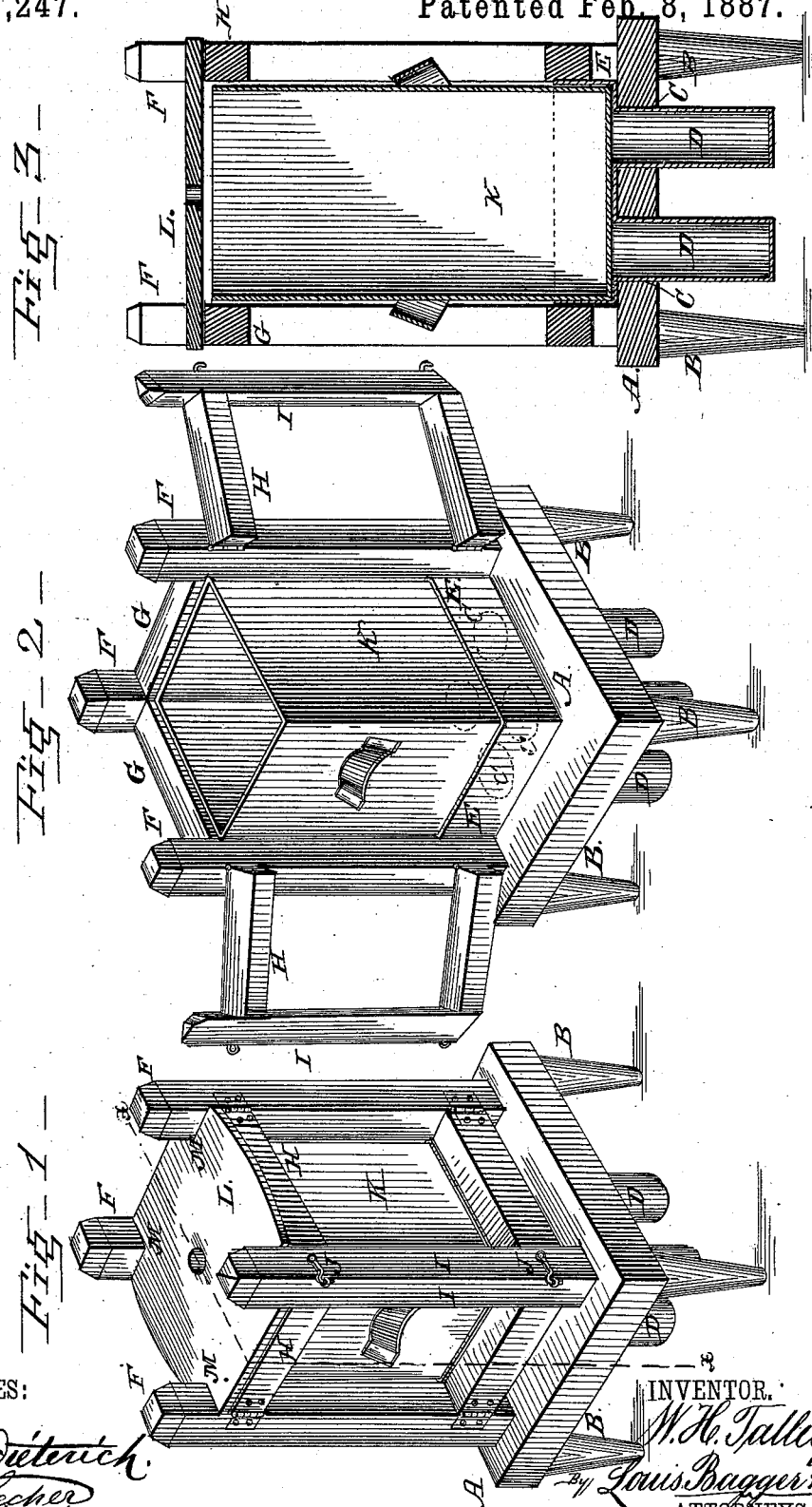

WILLIAM HENRY TALLEY, OF BUCHANAN, VIRGINIA.

CHURN.

SPECIFICATION forming part of Letters Patent No. 357,247, dated February 8, 1887.

Application filed February 4, 1884. Renewed July 12, 1886. Serial No. 207,818. (No model.)

*To all whom it may concern:*

Be it known that I, WILLIAM HENRY TALLEY, a citizen of the United States, and a resident of Buchanan, in the county of Botetourt and State of Virginia, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn. Fig. 2 is a perspective view of the frame opened; and Fig. 3 is a vertical section on line $x\ x$, Fig. 1.

Similar letters of reference indicate corresponding parts in all the figures.

My invention has relation to churns, and more particularly to the cream-receptacle and frame of a churn; and it consists in the improved construction and combination of parts of a churn in which the cream-receptacle is mounted in a frame, the lower end of which supports a receptacle adapted to hold hot water, serving to raise the temperature in the churn to the most suitable point, as hereinafter more fully described and claimed.

In the accompanying drawings, the letter A indicates a stool mounted upon legs B, and having four or more or less apertures, C, in its top, through which apertures a corresponding number of cylindrical vessels, D, project downward from the bottom of a pan, E, the apertures being of a size and shape corresponding to the size and shape of the vessels.

Three uprights, F, project from three corners of the rectangular top of the stool, and are connected by means of cross-pieces G near their upper and lower ends, and two cross-pieces, H, are hinged, at the same height as the rigid cross-pieces, to the sides of the two uprights, which are diagonally opposite to each other, and are secured at their outer ends to two mitered posts or uprights, I, the mitered sides of which fit against each other in such a manner that the two uprights will form an upright of the same size and shape as the rigid uprights. These movable uprights are connected by means of hooks and staples J, and in the rectangular frame formed by the uprights the cream-receptacle K is placed with its lower end fitting in the pan E, resting upon its bottom and covering the upper open ends of the vessels D.

A cover, L, having its corners cut out at M, is placed over the top of the cream-receptacle, and any construction of a dasher may be used in the receptacle.

It will now be seen that the cream-receptacle may be filled with cream or milk, the cylindrical vessels filled with hot water, and the receptacle placed in position in the pan and the frame closed, when, while churning, the temperature of the cream or milk contained in the receptacle will be raised, aiding in the separation of the butter-globules from the milk.

It will also be seen that the cylindrical vessels fitting in circular apertures in the top of the stool will remain firmly in place without being displaced while placing the receptacle in position or while removing it, and that only a smaller surface of the hot water being exposed to act upon the bottom of the receptacle, the water will only give off a small amount of its heat at the time, keeping it at its temperature for a long time, as the surfaces of the vessels may be prevented from radiating their heat by inserting them in some non-conducting substance.

Having thus described my invention, I claim and desire to secure by Letters Patent of the United States—

The combination of the stool with apertures in its top, an upright frame having two hinged sides provided with mitered uprights at their outer ends, the hot-water receptacle consisting of a rectangular pan and cylindrical vessels projecting from the bottom of the pan through the apertures in the top of the stool, and the rectangular cream-receptacle having a cover provided with corners cut out to correspond to the upper ends of the uprights, as and for the purpose shown and set forth.

In testimony that I claim the foregoing as my own I have hereunto affixed my signature in presence of two witnesses.

WILLIAM HENRY TALLEY.

Witnesses:
MEREDITH McGEHEE OGG,
GEORGE ALEX. SMITH.